United States Patent [19]
Fujii et al.

[11] 4,321,312
[45] Mar. 23, 1982

[54] METAL-HALOGEN SECONDARY BATTERY SYSTEM

[75] Inventors: Toshinobu Fujii, Hino; Takashi Hirose, Zushi; Naoki Kondo, Yokohama, all of Japan

[73] Assignee: Meidensha Electric Mfg. Co., Ltd., Tokyo, Japan

[21] Appl. No.: 205,093

[22] Filed: Nov. 10, 1980

[30] Foreign Application Priority Data

Nov. 14, 1979 [JP] Japan .................. 54-146393

[51] Int. Cl.$^3$ ............... H01M 10/54; H01M 12/02
[52] U.S. Cl. ........................... 429/12; 429/49; 429/105
[58] Field of Search ............ 429/12, 13, 14, 15, 429/17, 19, 34, 41, 49, 50, 51, 52, 101, 105

[56] References Cited

U.S. PATENT DOCUMENTS

| 3,379,572 | 4/1968 | Gay | 429/13 |
| 3,809,578 | 5/1974 | Symons | 429/51 |
| 3,993,502 | 11/1976 | Bjorkman | 429/19 |
| 4,146,680 | 3/1979 | Carr et al. | 429/51 |
| 4,147,840 | 4/1979 | Walsh et al. | 429/50 |
| 4,162,351 | 7/1979 | Putt et al. | 429/15 |

Primary Examiner—Donald L. Walton
Attorney, Agent, or Firm—Fleit & Jacobson

[57] ABSTRACT

A metal-halogen secondary battery system having electrolyte circulating lines for its positive and negative plate galvanic reaction chambers, further incorporates in the electrolyte circulating lines cleaning lines and a deionized line circulating line including a positive plate galvanic reaction chamber cleaning solution tank, a negative plate galvanic reaction chamber cleaning solution tank, a deionized water tank, a cleaning solution discharge pipe and a plurality of pipes and on-off valves for connecting and opening and closing the tanks and the discharge pipe, thereby making circulation cleaning of the reaction chambers possible and ensuring restoration of the battery characteristics and longer battery life.

7 Claims, 5 Drawing Figures

METAL-HALOGEN SECONDARY BATTERY SYSTEM

BACKGROUND OF THE INVENTION

The present invention relates to a metal-halogen secondary battery system in which the electrolyte circulating lines of positive and negative plate galvanic reaction chambers incorporate cleaning lines for cleaning the reaction chambers.

Secondary batteries known in the art are constructed so that in the case of the lead storage battery, for example, both the positive and negative plates are immersed in the same electrolyte contained in a battery case in which the plates are enclosed and the electrolyte is held in a stationary state, and the battery case is constructed by completely attaching the cover to the lower container, thus making it impossible from the structural point of view to take necessary measures for circulating the electrolyte, removing the cover to clean the interior of the battery case, etc. As a result, with the known secondary batteries it has been the usual practice to replace with new ones the inner components such as the plates when they are fouled with the products of electrolysis or the like and the electromotive force is decreased, thus inevitably causing an increase in the maintenance cost. Also, in the case of the metal-halogen secondary battery, in view of the nature of the battery that the active material on the halogen side (the positive plates) dissolves into the electrolyte, it is necessary to circulate the electrolyte so as to cause the active material to always contact uniformly with the plates and also the circulation of the electrolyte is effected as a means of preventing the precipitation of metal or the precipitation of a dendrite caused on the metal side (the negative plates) during the charging with a high current density. The electrolytes for the positive and negative plates are separated from each other by an ion exchange membrane so as to prevent the plate electrolytes from being mixed together and prevent the occurrence of self-discharge.

SUMMARY OF THE INVENTION

In view of these circumstances in the prior art, it is the object of the present invention to provide a metal-halogen secondary battery system so designed that its electrolyte circulating lines are utilized so as to accomplish both the circulation of the electrolytes and cleaning of the interior of positive and negative galvanic reaction chambers, whereby when the metal-halogen secondary battery is used for a predetermined period of time or when the battery electromotive force decreases due to an increase in the internal resistance, a part of the circulating lines is utilized in such a manner that the electrolytes in the reaction chambers are removed and the plates and the diaphragms (ion exchange membranes) in the chambers are cleaned by means of cleaning solutions, thus restoring the characteristics of the battery and increasing its service life.

In accordance with the present invention there is thus provided a metal-halogen storage battery system comprising a positive plate electrolyte circulating line including a positive plate electrolyte tank and a first pump which are connected in loop form with positive plate galvanic reaction chambers of the battery so as to circulate a positive plate electrolyte, e.g., a solution of $ZnBr_2$ and $Br_2$ through the positive plate galvanic reaction chambers, a negative plate electrolyte circulating line including a negative plate electrolyte tank and a second pump which are connected in loop form with negative plate galvanic reaction chambers of the battery so as to circulate a negative plate electrolyte, e.g., a solution of $ZnBr_2$ through the negative plate galvanic reaction chambers, an electrolyte discharge pipe connected through discharging on-off valves to the positive and negative galvanic reaction chambers so as to discharge the positive and negative plate electrolytes respectively contained in the reaction chambers to the outside of the lines, a positive plate galvanic reaction chamber cleaning line adapted to be formed by the connection, in place of the positive plate electrolyte tank, of a positive plate galvanic reaction chamber cleaning solution tank to the positive plate galvanic reaction chambers by means of a change-over on-off valve through the first pump, a negative plate galvanic reaction chamber cleaning line adapted to be formed by the connection, in place of the negative plate electrolyte tank, of a negative plate galvanic reaction chamber cleaning solution tank by means of another change-over on-off valve through the second pump, a deionized water circulating line adapted to be formed by the connection of a deionized water tank to the cleaning lines through connecting on-off valves so as to circulate through the cleaning lines deionized water in place of the cleaning solutions, and a cleaning solution discharge pipe connected to the cleaning lines through another discharging on-off valves so as to discharge the cleaning solutions or the deionized water in the cleaning lines to the outside thereof, the electrolyte tanks being connected to an electrolyte discharge pipe through still another discharging on-off valves so as to discharge the electrolytes from the electrolyte tanks for electrolyte replacing purposes. Of course, the necessary supply lines are also provided for effecting the replenishment of electrolytes to the electrolyte tanks, the replenishment of cleaning solutions to the cleaning solution tanks and the replenishment of deionized water to the deionized water tank.

In accordance with the present invention, with the positive and negative plate electrolytes which were previously mentioned by way of example, it is possible to use for example an alkaline solution such as sodium hydroxide solution or potassium hydroxide solution as the positive plate chamber cleaning solution and an inorganic acid, e.g, hydrochloride acid, sulfuric acid, nitric acid or phosphoric acid as the negative plate chamber cleaning solution, and by effecting the desired circulation cleaning with the cleaning solutions and deionized water, it is possible to regenerate the diaphragms (ion exchange membranes) in the galvanic reaction chambers, to restore the deteriorated battery characteristic by the dissolution of the metallic zinc of the positive plates and to increase the battery life. To clean the interior of the positive plate galvanic reaction chamber with an alkaline solution has the effect of neutralizing and removing the halogen molecules or halogen compounds deposited on the surface of the ion exchange membranes and restoring the function of the ion exchange membranes. The effect of cleaning the interior of the negative plate galvanic reaction chamber with an inorganic acid lies in dissolving the metal (Zn) which was precipitated and left on the negative plates and dissolving and removing the trace impurities in the water such as $CaCo_3$ and $Mg_2CO_3$ which were caught in the ion exchange membrane so as to restore the characteristics of the electrode plates and the ion exchange membranes to the initial conditions, and it also has the effect of dissolving the metal particles flaked off the part of the plates during the metal precipitation on the negative plates and thereby improving the flow properties of the circulating solutions in the reaction chambers and the pipes.

The concentrations of the cleaning solutions or the alkaline solution and the inorganic acid solution are predetermined in dependence on the cleaning time. While the cleaning time decreases with an increase in the concentrations, if the concentrations are increased excessively, a considerable time will be required for removing the acid and the alkaline solution sticked to the reaction chambers and the inner wall of the pipes during the final cleaning operation by the deionized water. Thus, generally the concentrations should preferably be in the range of 5 to 60% and in the range of 15 to 40% particularly when reduction in the total cleaning time is considered.

Other features and advantages of the present invention will become readily apparent from the following detailed description taken in conjunction with the accompanying drawings.

BRIEF DESCRIPTION OF THE INVENTION

DESCRIPTION OF THE PREFERRED EMBODIMENT

The basic construction of a metal-halogen secondary battery system of this invention will now be described with reference to FIG. 1. For purposes of description, the system includes a unit cell which is shown as having only two galvanic reaction chambers of positive and negative plates instead of the usual multiple-stage reaction chambers.

Figure 1:
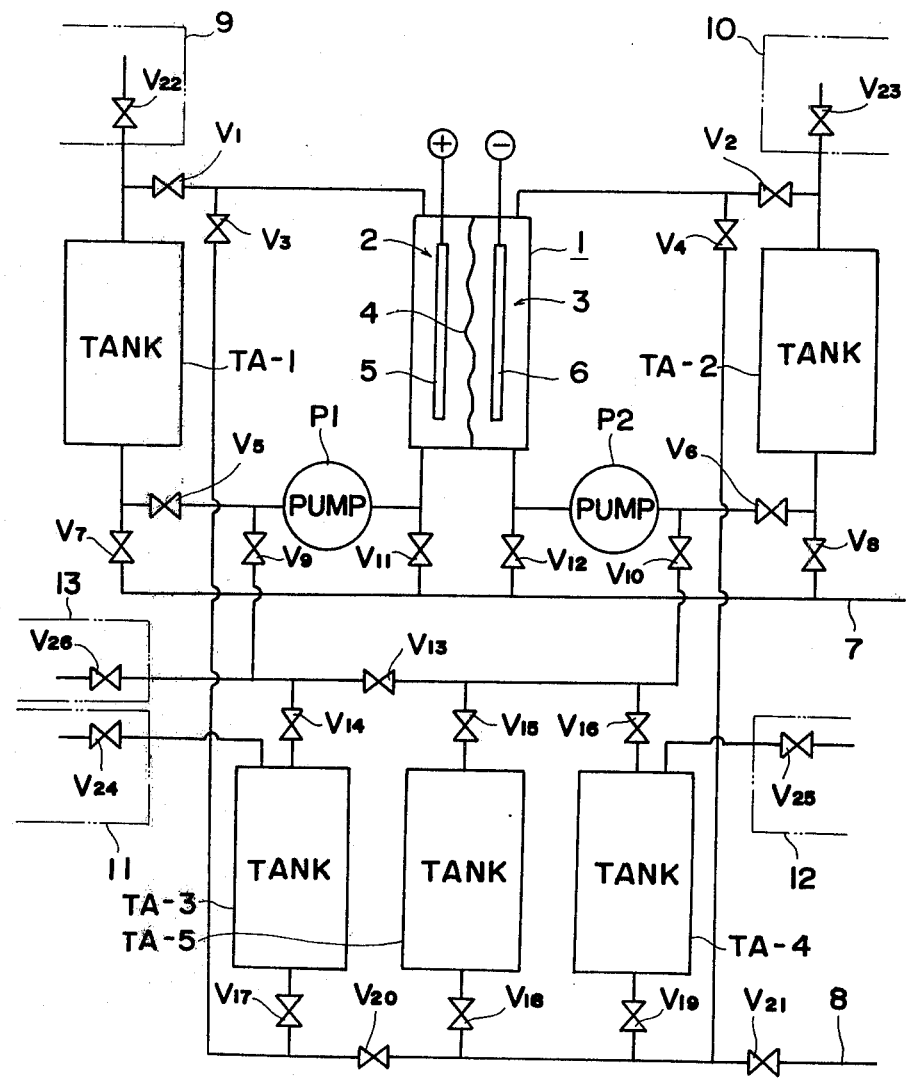
FIG. 1 is a connection diagram showing the basic construction of a metal-halogen secondary battery system according to the present invention.

In FIG. 1, numeral 1 designates a cell container whose interior is divided by a diaphragm 4 (ion exchange membrane) into a positive plate galvanic reaction chamber 2 and a negative plate galvanic reaction chamber 3, and a positive plate 5 and a negative plate 6 are respectively placed in the reaction chambers 2 and 3. Designated as TA-1 is a positive plate electrolyte tank, TA-2 a negative plate electrolyte tank, TA-3 a positive plate galvanic reaction chamber cleaning solution tank, TA-4 a negative plate galvanic reaction chamber cleaning solution tank, TA-5 a deionized water tank, P1 a first pump, P2 a second pump, 7 an electrolyte discharge pipe line, 8 a cleaning solution discharge pipe line, 9 a positive plate electrolyte supply source, 10 a negative plate electrolyte supply source, 11 a positive plate galvanic reaction chamber cleaning solution supply source, 12 a negative plate galvanic reaction chamber cleaning solution supply source, 13 a deionized water supply source, $V_1$ to $V_{26}$ on-off valves of which $V_1$, $V_2$, $V_3$, $V_4$, $V_5$, $V_6$, $V_9$ and $V_{10}$ are change-over on-off valves, $V_7$, $V_8$, $V_{11}$, $V_{12}$, and $V_{21}$ are discharging on-off valves, $V_{13}$, $V_{14}$, $V_{15}$, $V_{16}$, $V_{17}$, $V_{18}$, $V_{19}$, and $V_{20}$ are connecting on-off valves and $V_{22}$, $V_{23}$, $V_{24}$, $V_{25}$ and $V_{26}$ are supply on-off valves.

The positive plate galvanic reaction chamber 2 is connected in loop form with the positive plate electrolyte tank TA-1 through the on-off valves $V_1$ and $V_5$ and the first pump P1 so as to form a positive plate electrolyte circulating line through which the positive plate electrolyte is circulated by means of the pump P1.

The negative plate galvanic reaction chamber 3 is similarly connected in loop form with the negative plate electrolyte tank TA-2 through the on-off valves $V_2$ and $V_6$ and the second pump P2, thus forming a negative plate electrolyte circulating line through which the negative plate electrolyte is circulated by means of the pump P2.

Figure 2:
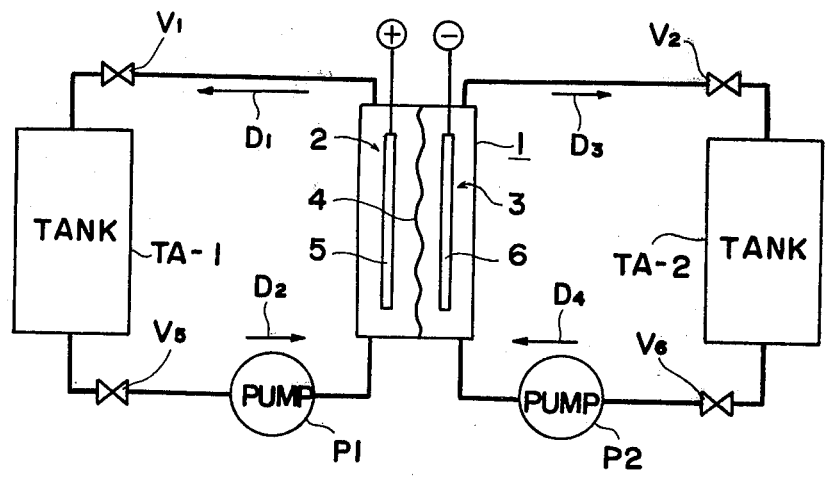
FIG. 2 is a diagram showing the connections of the system of FIG. 1 during the normal battery operation.

As a result, as shown in FIG. 2, in the normal battery operation only the on-off valves $V_1$, $V_2$, $V_5$ and $V_6$ are opened and the pumps P1 and P2 are operated. Thus, the electrolytes in the electrolyte tanks are circulated through the electrolyte circulating lines so as to fill the positive and negative plate galvanic reaction chambers 2 and 3 with the electrolytes.

Figure 3:
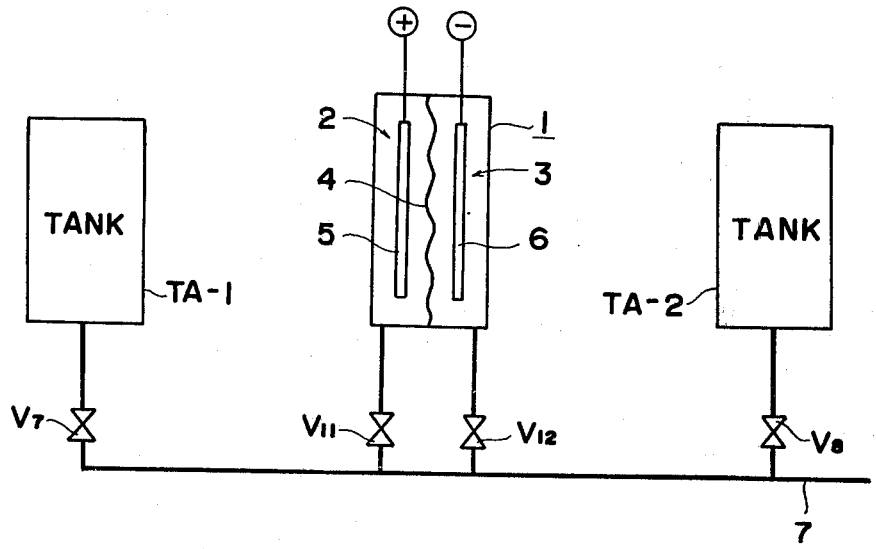
FIG. 3 is a diagram showing the connections of the system of FIG. 1 during the discharging of the remaining electrolytes in the galvanic reaction chambers.

Also, as shown in FIG. 3, the galvanic reaction chambers 2 and 3 can be respectively connected through the discharging on-off valves $V_{11}$ and $V_{12}$ to the electrolyte discharge pipe line 7 and the electrolyte tanks TA-1 and TA-2 can be respectively connected through the discharging on-off valves $V_7$ and $V_8$ to the discharge pipe line 7, thus allowing the discharge of the deteriorated electrolytes to the outside of the lines.

Figure 4:
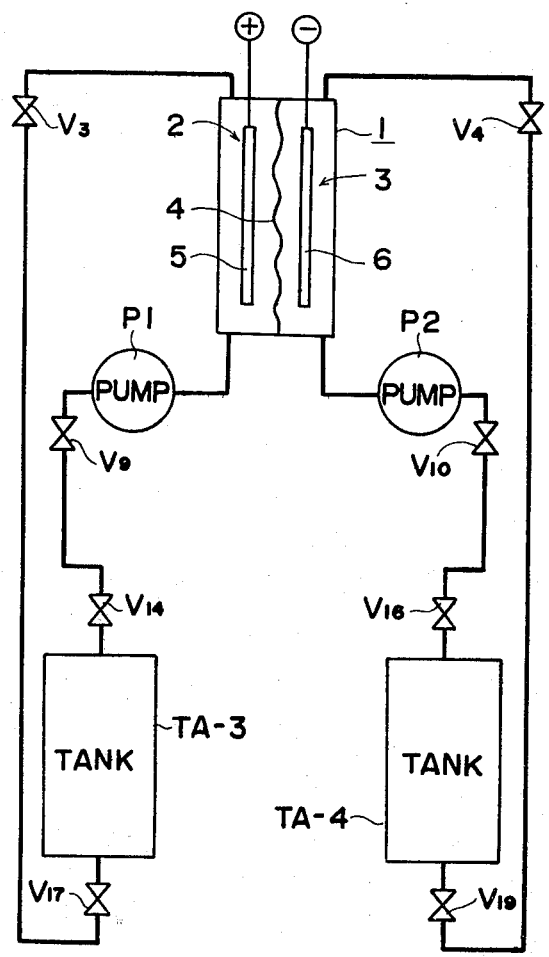
FIG. 4 is a diagram showing the connections of the system of FIG. 1 during the circulation cleaning of the galvanic reaction chambers.

On the other hand, with the positive plate galvanic reaction chamber cleaning solution tank TA-3 being connected to the ends of the connected combination of the positive plate galvanic reaction chamber 2 and the first pump P1 through the on-off valves $V_3$, $V_9$, $V_{14}$ and $V_{17}$, if, following the closing of the on-off valves $V_1$ and $V_5$, the on-off valves $V_3$ and $V_9$ are opened and the on-off valves $V_{14}$ and $V_{17}$ are also opened, a loop-type positive plate galvanic reaction chamber cleaning line including the positive plate galvanic reaction chamber 2 and the first pump P1 is established as shown in FIG. 4.

Similarly, with the negative plate galvanic reaction chamber cleaning solution tank TA-4 being connected to the ends of the connected combination of the negative plate galvanic reaction chamber 3 and the second pump P2 through the on-off valves $V_4$, $V_{10}$, $V_{16}$ and $V_{19}$, if, following the closing of the on-off valves $V_2$ and $V_6$, the on-off valves $V_4$ and $V_{10}$ are opened and the on-off valves $V_{16}$ and $V_{19}$ are also opened, a loop-type negative plate galvanic reaction chamber cleaning line including the negative plate galvanic reaction chamber 3 and the second pump P2 is established as shown in FIG. 4.

Figure 5:
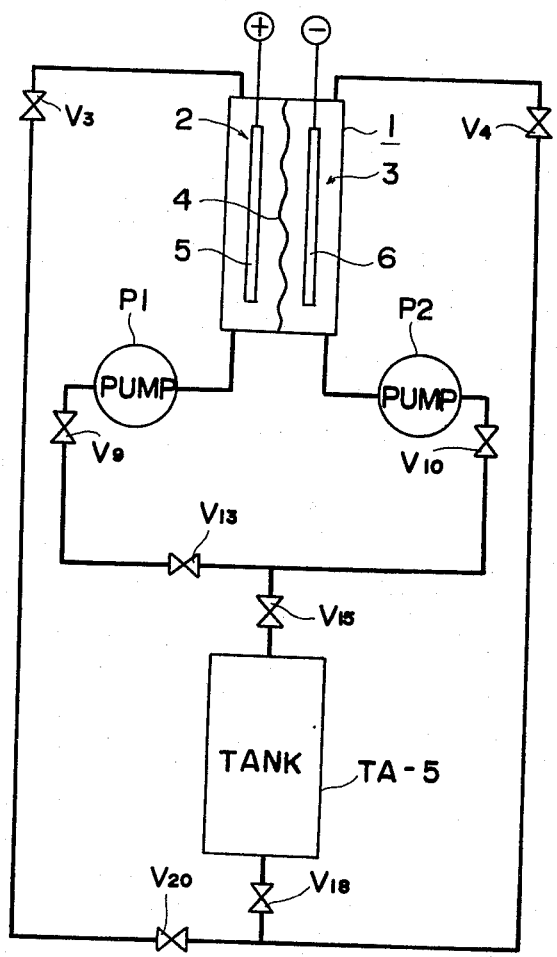
FIG. 5 is a diagram showing the connections of the systems of FIG. 1 during the final cleaning operation by means of deionized water.

As shown in FIG. 5, the deionized water tank TA-5 is connected to the negative plate galvanic reaction chamber cleaning line through the connecting on-off valves $V_{15}$ and $V_{18}$ so as to be connected in parallel with the cleaning solution tank TA-4 and the tank TA-5 is also connected to the positive plate galvanic reaction chamber cleaning line so as to be parallel with the cleaning solution tank TA-3 through the connecting on-off valves $V_{13}$ and $V_{20}$ which connect the two cleaning lines in parallel with each other, thus forming a deionized water circulating line. The negative plate galvanic reaction chamber cleaning line adapted to be connected in parallel with the positive plate galvanic reaction chamber cleaning line upon opening of the on-off valves $V_{13}$ and $V_{20}$, is connected to the cleaning solution discharge pipe line 8 through the discharging on-off valve $V_{21}$.

With the above-constructed metal-halogen secondary battery system according to the present invention, as already mentioned in connection with FIG. 2, in the normal battery operation only the on-off valves $V_1$, $V_2$, $V_5$ and $V_6$ are opened and the other on-off valves are all closed. Thus, the operation of the pumps P1 and P2 causes the electrolytes in the positive and negative plate galvanic reaction chambers 2 and 3 to circulate respectively in the directions of arrows $D_1$, $D_2$ and $D_3$, $D_4$ as mentioned previously.

On the other hand, in the case of a periodic cleaning or a cleaning operation due to the decreased electromotive force, the pumps P1 and P2 are stopped and the on-off valves $V_1$, $V_2$, $V_5$ and $V_6$ are closed, thus feeding the positive and negative plate electrolytes back into the electrolytes TA-1 and TA-2.

Then, as shown in FIG. 3, the discharging on-off valves $V_{11}$ and $V_{12}$ are opened to discharge the remaining electrolytes in the galvanic reaction chambers 2 and 3 to the outside of the lines. Also, if the electrolytes in the electrolyte tanks TA-1 and TA-2 are not needed, the discharging on-off valves $V_7$ and $V_8$ are also opened to discharge the electrolytes to the outside of the lines. Then, the on-off valves $V_{11}$ and $V_{12}$ are closed and also the on-off valves $V_7$ and $V_8$ are closed. Then, the supply on-off valves $V_{22}$ and $V_{23}$ are opened as occasion demands and a new supply of electrolyte is fed into the electrolyte tanks TA-1 and TA-2, respectively.

On the other hand, as shown in FIG. 4, the on-off valves $V_3$, $V_9$, $V_{14}$, $V_{17}$ and $V_4$ $V_{10}$, $V_{16}$, $V_{19}$ are respectively opened to establish the positive and negative plate cleaning lines and then the pumps P1 and P2 are operated, thus cleaning the interior of the galvanic reaction chambers 2 and 3 by the circulating cleaning solutions. In this case, the on-off valves $V_{13}$ and $V_{20}$ remain closed and thus the positive and negative plate cleaning solutions are circulated independently of each other without the danger of being mixed with each other. After the expiration of a predetermined time, the pumps P1 and P2 are stopped and the on-off valves $V_{20}$ and $V_{21}$ are opened and the cleaning solutions in the cleaning lines are discharged through the cleaning solution discharge pipe line 8 to the outside of the lines. In this case, it is needless to say that the connections of the reaction chambers 2 and 3 and the cleaning solution tanks TA-3 and TA-4 with the pipes of the cleaning lines and the discharge pipe line 8 are selected in consideration of the difference in level such that all the cleaning solutions are discharged to the discharge pipe line by gravity flow due to the difference in level.

After this discharge of the cleaning solutions has been completed, as shown in FIG. 5, with the on-off valves $V_3$, $V_4$, $V_9$, $V_{10}$ and $V_{20}$ being left open, the on-off valves $V_{14}$, $V_{16}$, $V_{17}$, $V_{19}$ and $V_{21}$ are closed and the on-off valves $V_{13}$, $V_{15}$ and $V_{18}$ are opened. Then, the pumps P1 and P2 are operated thus effecting the final cleaning by the deionized water in the tank TA-5. This final cleaning by the deionized water is effected for the purpose of removing the alkaline solution and the inorganic acid solution remaining in the galvanic reaction chambers 2 and 3, the pipes and the pumps P1 and P2. Thus, after the cleaning for a predetermined time, the pumps P1 and P2 are stopped and the on-off valve $V_{21}$ is opened, thereby discharging the deionized water. Thereafter, if necessary, a new supply of cleaning solution is fed into the positive plate galvanic reaction chamber cleaning solution tank TA-3 through the supply on-off valve $V_{24}$ from the positive plate cleaning solution supply source 11, and the cleaning solution of the negative plate galvanic reaction chamber cleaning solution tank TA-4 is replenished from the negative plate cleaning solution supply source 12 through the supply on-off valve $V_{25}$. Also the deionized water tank TA-5 is replenished from the deionized water supply source 13 through the on-off valves $V_{26}$, $V_{13}$ and $V_{15}$. In this way, preparation is made for the next cleaning.

After all the cleaning operations have been completed, the system is returned to the initial condition in which only the on-off valves $V_1$, $V_2$, $V_5$ and $V_6$ are opened and the remaining valves are closed and then the pumps P1 and P2 are operated again, thus returning the system to the normal operation condition as the battery again.

It will thus be seen from the foregoing that the present invention is advantageous in that the interior of the galvanic reaction chambers can be automatically cleaned through an effective utilization of the conventional electrolyte circulating lines without the need to disassemble the galvanic reaction chambers and that the operation can be performed remotely by electromagnetically operating the on-off valves from a distant place, thus greatly contributing toward restoration of the characteristics of a secondary battery and increasing its service life.

What is claimed is:

1. A metal-halogen secondary battery system comprising:

a positive plate electrolyte circulating line including a positive plate electrolyte tank and a first pump for circulating a positive plate electrolyte into at least one positive plate galvanic reaction chamber;

a negative plate electrolyte circulating line including a negative plate electrolyte tank and a second pump for circulating a negative plate electrolyte into at least one negative plate galvanic reaction chamber;

an electrolyte discharge pipe line connected to each of said positive and negative plate galvanic reaction chambers through a discharging on-off valve so as to discharge said positive and negative plate electrolytes in said positive and negative plate galvanic reaction chambers to the outside of said electrolyte circulating lines;

a positive plate galvanic reaction chamber cleaning line established by connecting, in place of said positive plate electrolyte tank, a positive plate galvanic reaction chamber cleaning solution tank to said positive plate galvanic reaction chamber through said first pump and first change-over on-off valve means;

a negative plate galvanic reaction chamber cleaning line established by connecting, in place of said negative plate electrolyte tank, a negative plate galvanic reaction chamber cleaning solution tank to said negative plate galvanic reaction chamber through said second pump and second change-over on-off valve means;

a deionized water circulating line established by connecting a deionized water tank to said cleaning line through connecting on-off valves so as to circulate deionized water instead of said cleaning solutions through said cleaning lines; and a cleaning solution discharge pipe line connected to said cleaning line through a third discharging on-off valve so as to discharge said cleaning solutions or said deionized water existing in said cleaning lines to the outside thereof.

2. A system according to claim 1, wherein said positive and negative electrolyte tanks are respectively connected through fourth and fifth discharging on-off valves to said electrolyte discharge pipe line.

3. A system according to claim 1, wherein said first change-over on-off valve means of said positive plate galvanic reaction chamber cleaning line includes a first on-off valve for changing the connection of said positive plate galvanic reaction chamber from said positive electrolyte tank to said positive plate galvanic reaction chamber cleaning solution tank, and a second on-off valve for changing the connection of said first pump from said positive plate electrolyte tank to said positive plate galvanic reaction chamber cleaning solution tank.

4. A system according to claim 1, wherein said second change-over on-off valve means of said negative plate galvanic reaction chamber cleaning line includes a third on-off valve for changing the connection of said negative plate galvanic reaction chamber from said negative plate electrolyte tank to said negative plate galvanic reaction chamber cleaning solution tank, and a fourth on-off valve for changing the connection of said second pump from said negative plate electrolyte tank to said negative plate galvanic reaction chamber cleaning solution tank.

5. A system according to claim 3 or 4, wherein another connecting on-off valve is provided at each of the input and output ends of said deionized water tank.

6. A system according to claim 1, wherein said first-mentioned connecting on-off valves of said ionized water circulating line are each provided in one of two pipes connecting said positive plate galvanic reaction chamber cleaning line and said negative plate galvanic reaction chamber cleaning line with each other.

7. A system according to claim 6, wherein still another connecting on-off valve is provided at each of the input and output ends of each of said positive plate galvanic reaction chamber cleaning solution tank and said negative plate galvanic reaction chamber cleaning solution tank.

* * * * *